UNITED STATES PATENT OFFICE.

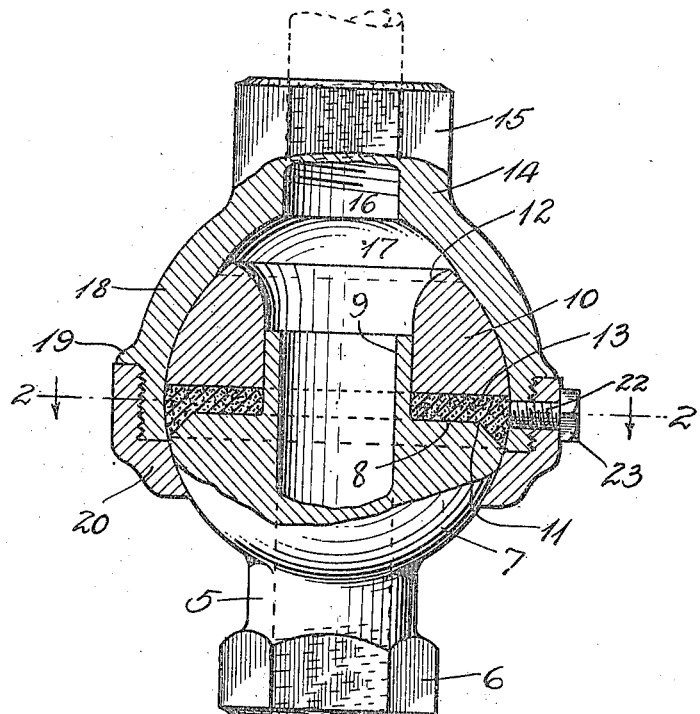

WALTER C. WHITE, OF LOS ANGELES, CALIFORNIA, ASSIGNOR TO INTERNATIONAL COUPLERS COMPANY, OF LOS ANGELES, CALIFORNIA, A CORPORATION OF CALIFORNIA.

FLEXIBLE PIPE-JOINT.

1,184,666.  Specification of Letters Patent.  Patented May 23, 1916.

Application filed September 23, 1912, Serial No. 721,736. Renewed August 19, 1915. Serial No. 46,349.

*To all whom it may concern:*

Be it known that I, WALTER C. WHITE, a citizen of the United States, residing at Los Angeles, in the county of Los Angeles and State of California, have invented a new and useful Improvement in Flexible Pipe-Joints, of which the following is a specification.

This invention relates to flexible joints which are designed to supplant rubber hose now used in fluid pressure systems, and the principal object is to provide an absolutely fluid tight, flexible, metallic joint capable of being assembled without disconnecting its members from the connecting pipes.

It is also an object to provide a ball and socket joint of the above character with an annular packing groove on the ball to feed the packing toward the beveled periphery of the groove and in positive engagement with the bearing surface.

It is a further object to provide the ball of the joint with two hemi-spherical sections having a suitable flexible packing interposed between the sections whereby the pressure will bear on a movable end passing the packing to the bearing surfaces together with means for gaining access to the said packing without uncoupling the joints.

In the drawings accompanying this specification and forming therewith the application for Letters Patent Figure 1 is an elevation of the improved joint, a portion of the device being broken away and shown in central longitudinal section. Fig. 2 is a cross section on the line 2—2 of Fig. 1, the packing not being shown.

Heretofore in the operation of flexible metallic joints difficulty has been experienced in maintaining a tight joint owing to the inability of the packing to properly take up against the surface to complete a tight joint, and the component elements of such a joint have necessitated moving the same from the connecting pipes to renew the packing.

This invention overcomes the above difficulties by providing a packing that will feed toward the bearing surfaces, access to which may be obtained without uncoupling the joint, and the joint may be uncoupled without disconnecting the members from the connected pipe line.

More specifically in the drawings 5 represents the body portion of the ball member of the joint provided with a threaded bore to receive a metallic pipe of the pipe line to which it is desired to apply a flexible joint. Suitable wrench faces 6 are provided to secure the member to the adjacent pipe, and projecting from the opposite end of the member is the rigid portion 7 of the spherical head of the ball joint. The radius of this ball is, as shown, preferably of the diameter of the body portion 5 and at a point which is just below the center, the distance corresponding to about one-half the desired thickness of the packing, the member is faced off at 8 in the plane parallel to the equatorial plane of the ball and at right angles to the bore, leaving the annular flange 9 of such length as to form a sleeve support and hold in positive relation the movable hemispherical portion 10 of the ball as well as the packing. At the point 11 on the surface 8 of the body member a bevel outward and toward the body 5 is made, the function of which will be described hereafter.

As before stated, the movable hemispherical section 10 of the ball is of such configuration as to complete the spherical form when the packing is introduced intermediate of the two sections of the ball, this section being provided with a bore at right angles to its equational plane which fits over the sleeve 9 and forms slight slidable contact therewith. This bore practically converts the section 10 into an annular ring, the bore therein being curved or sloped outward toward the peripheral surface of the section as indicated at 12, so that the passage of the pressure medium will not be materially interrupted when the position of the component members are changed and form an angular passage, and a greater area will be exposed to the pressure and assists in compressing the packing interposed.

The packing 13 is preferably composed of the usual composition including fiber, graphite and other unctuous components that will provide a flexible and elastic medium interposed between the sections, and will effectively lubricate the bearing surfaces with which it comes in contact, and feed toward these surfaces to complete and insure a tight joint.

The socket member 14 of the joint is provided with the wrench faces 15 and a screw threaded bore adapted to receive the other end of the pipe line it is desired to flexibly connect, this bore communicating with the socket chamber 17 which is accurately machined to form a tight joint with the component members of the spherical head of the ball member. The flanged walls 18 of the socket are carried slightly beyond the equatorial plane of the device to a joint where the internal diameter will not exceed the greatest diameter of any of the metallic portions of the spherical head, the external periphery of these walls being threaded from their edge inwardly to the annular shoulder 19. Engaging with the threaded periphery is the threaded annular ring 20 which is also machined to accurately fit the spherical head where its internal faces form contact therewith, these bearing surfaces being of such area to securely hold the head in the socket when the ring is screwed to its seat against the annular shoulder 19, the joint formed in the bearing surfaces being accurately fitted.

The threaded flanges of the walls 18 and the ring 20 extend on either side of the equatorial plane and at one point on their periphery a bore is threaded in this plane through both of the flanges and their threads, this bore being threaded to receive the screw 22 provided with the hexagon head 23. This screw is preferably machined on its inner end to form an accurate surface to the inner surface of the socket and provides means for securely locking the component elements of the socket members and thereby lock the head securely in the joint and also in its removal provides access to the packing ring so that the packing, where a pulverized form is used can be introduced, or a liquid introduced to assist action of any other type of packing.

As can be readily seen in the operation of the joint, the two members can be threaded onto the terminal ends of a pipe line, the two members brought together and the spherical head introduced into the socket after the annular ring has been slipped over the head, and the ring threaded onto the socket member. If pulverized packing is used it can now be introduced when the opening for the screw 22 registers, or liquid may be introduced to swell and lubricate other types of packing previously applied in the form of a solid ring. When pressure is applied to the line including the joint the same will be exerted on the exposed area of the section 10 pressing the packing and compressing the same against the face of the hemispherical section 7, the latter taking up tightly against the bearing surfaces of the ring 20, thus insuring a perfectly tight joint. The sleeve 9 prevents the packing from "feeding" toward the center so that it necessitates the feeding outward, the inclined bevel assisting in this action and increasing the width of the packing bearing on the smooth surface of the socket. A portion of the socket adjacent to bore may be cut as is shown, to reduce the amount of machining and surfacing required to receive the bearing surfaces of the ball.

What I claim is:

1. A flexible pipe joint, comprising a ball member formed of a pair of hemispherical sections adapted to slide in relation to each other, having registering bores, one section having a sleeve concentric with its bore engaging in the registering concentric bore in the other section, a packing interposed between said sections and extending to the periphery of said ball, and a socket to receive said ball and engage with said packing.

2. A flexible ball joint, comprising a ball member formed of a plurality of sections having a central bore, one of said sections forming a hemispherical head, a sleeve on the equatorial face of said hemispherical head and formed concentric with its bore, a substantially hemispherical section having a bore slidably engaging said sleeve, a packing interposed between said sections and forming therewith a spherical bearing surface, and a socket having a spherical bearing surface to engage and embrace said ball member.

3. A flexible ball joint, comprising a ball member formed of a plurality of sections having a central bore one of said sections formed as a hemispherical head with an annular bevel on its equatorial plane, a sleeve extending from the plane of said head concentric with the bore, the second hemispherical section with its bore engaging said sleeve, a packing interposed between said sections, and filling the beveled annular groove formed by the bevel, a socket member having a bore and a hemispherical recess connected therewith and a threaded periphery, and an annular threaded ring to secure said spherical head in said socket.

4. A flexible ball joint, comprising a ball member formed of a pair of sections each having a polar bore and an equatorial face, one of said sections formed as a hemispherical head with an annular bevel on the periphery of its equatorial face, a sleeve extending from the face of said head section concentric with its bore, the second of said sections being hemispherical, its bore engaging said sleeve, a packing interposed between the faces of said sections and filling the beveled annular groove formed intermediate the faces and the bevel, a socket member having a bore and a hemispherical recess connected therewith, also having a threaded periphery with a bore therethrough, an annular ring having a bore therethrough registering with the bore in the threaded periphery of said socket member, and a closure for said registered bores, whereby the ring is locked and entrance to said packing is provided.

In witness that I claim the foregoing I have hereunto subscribed my name this 7th day of September, 1912.

WALTER C. WHITE.

Witnesses:
ROLLIN KERNS,
W. P. KEENE.